2,845,420
DIOXAZINE DYESTUFFS

Harlan B. Freyermuth, Easton, Pa., Robert D. Jackson, Binghamton, N. Y., and David I. Randall, New Vernon, N. J., assignors to General Aniline & Film Corporation, New York, N. Y., a corporation of Delaware No Drawing. Application October 26, 1956
Serial No. 618,655

11 Claims. (Cl. 260—246)

This invention relates to the production of phosphonated dioxazine dyestuffs and more particularly to the production of phosphonated derivatives of dioxazine dyestuffs obtained by reaction between chloranil and a 3-aminocarbazole followed by ring closure. The novel phosphonated dioxazine dyestuffs of the instant invention have the following formula

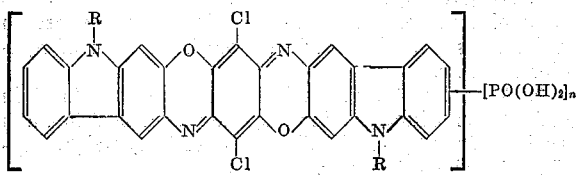

wherein R is selected from the group consisting of hydrogen, lower alkyl, lower haloalkyl, lower cyanoalkyl, lower hydroxyalkyl, cycloalkyl, aralkyl, and aryl; and $n$ has a value of 1 to 2.

It has been unexpectedly found that the dyestuffs of the instant invention, in surprising contrast to the corresponding known sulfonated dioxazine dyestuffs, are insoluble in water but may be vatted by reduction in aqueous organic solvent solutions using sodium hydrosulfite to produce a vat having good affinity for nylon and yielding, after oxidation of the reduced or vatted form of the dyestuff in usual manner with air and/or known oxidizing agents, brilliant blue dyeings of excellent light fastness and much brighter and greener in shade than dyeings obtained by dyeing nylon with the corresponding sulfonated dyestuffs from a dilute acetic acid bath. As known oxidizing agents, there may be mentioned the chlorinated aromatic sulfonamides, hydrogen peroxide, and the ammonium and alkali metal perborates, percarbonates, peroxides, persulfates and bichromates.

Dioxazine dyestuffs and their sulfonated and halogenated derivatives are well known in the art, as see for example U. S. Patent Nos. 2,016,013, 2,026,902, 2,115,508 and 2,143,598. These dioxazine dyestuffs are prepared in known manner by reaction between 1 mole of chloranil (tetrachloroquinone) and 2 moles of a 3-aminocarbazole followed by ring closing the resulting reaction product in the presence of an oxidizing agent. For example, 3-amino-9-ethylcarbazole may be condensed with chloranil in 95% ethanol or in o-dichlorobenzene in the presence of sodium acetate as an acid binding agent, and the resulting reaction product ring closed by treatment with benzene sulfonyl chloride or by refluxing in nitrobenzene in the presence of potassium ferricyanide or a mixture of benzoyl chloride and manganese dioxide.

In accordance with the instant invention, a dioxazine dyestuff of the type above described is dissolved in tetraphosphoric acid (commonly referred to as phospholeum) having a $P_2O_5$ content of about 76 to 86% by weight and preferably about 83–84%, at elevated temperatures of about 100 to 200° C. and the solution maintained within said temperature range until phosphonation is completed. The completion of the reaction is usually indicated when the reaction mixture begins to foam. The desired phosphonated dioxazine dyestuff is then separated from the reaction mixture, preferably by diluting the reaction mixture with water to precipitate the product which is then filtered off and further treated in known manner.

In the above formula, R may be hydrogen, methyl, ethyl, propyl, chloromethyl, chloroethyl, cyanoethyl, hydroxymethyl, hydroxyethyl, hydroxpropyl, cyclohexyl, benzyl, phenyl, diphenyl, naphthyl, or the like. Products containing any of these values may be obtained by employing as an initial reactant a 3-aminocarbazole suitably substituted in the 9-position by the desired R value.

In carrying out the treatment of the dioxazine dyestuff in accordance with the instant invention, only sufficient dyestuff is added to the phospholeum which will dissolve therein. Relatively concentrated, or saturated solutions of the dioxazine dyestuff in the phospholeum are of course economically desirable, but more dilute solutions are also operative. Solution is preferably carried out by slowly adding the dyestuff to the phospholeum to prevent lumping, the phospholeum being maintained at a temperature within the above-mentioned temperature range, after which the solution is maintained within said range until the desired phosphono derivative is produced. Higher temperatures and longer reaction times favor production of diphosphono derivatives. If desired, the reaction mixture may be agitated during the heat treatment.

Vat dyeing solutions containing the vatted or reduced form of the instant phosphonated dioxazine dyestuffs, suitable for dyeing nylon fibrous materials and the like in blue shades of excellent light fastness may be prepared by treatment of the dyestuff with a reducing agent such as sodium hydrosulfite and, if desired, an alkali such as caustic soda, in an aqueous organic solvent medium. Such organic solvent should be miscible in water (soluble) in the concentrations of about 25 to 85% by weight employed herein as the above-mentioned aqueous organic solvent medium. Said organic solvent should also be a solvent for the phosphonated dyestuff. Examples of such solvents include picoline, formamide, N-ethyl-, N,N-dimethyl-, N,N,-diethyl-formamides and, preferably, pyridine and mixtures thereof and the like. A sufficient amount of dyestuff is included in this medium to achieve the desired shade of dyeing, usually about .05 to 2% by weight in said medium and about .5 to 5% by weight of the fiber being dyed, and the dyestuff reduced in this medium by treatment with a sufficient amount of reducing agent such as sodium hydrosulfite to produce therein the soluble reduced or vatted form of the dyestuff. The solution is then diluted with about 2 to 10 times its weight with water and nylon fibrous material treated in the resulting vat dyeing bath at fiber:liquor ratios of from about 1:5 to 1:50 for a sufficient time to permit exhaustion of the vatted dyestuff on the fibrous material, after which the material is rinsed in water and oxidized, all in known manner.

The following examples, in which parts are by weight unless otherwise indicated, are illustrative of the instant invention and are not to be regarded as limitative.

Example 1

50 g. of the dioxazine dyestuff of the formula

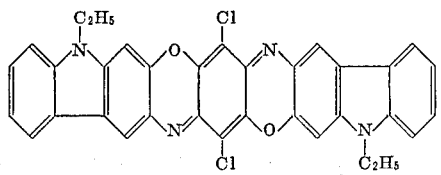

produced by reacting 1 mole of chloranil with 2 moles of 3-amino-9-ethylcarbazole followed by ring closure in the presence of benzene sulfonyl chloride, is dissolved in 500 g. of phospholeum (83%) at 160° C. The dyestuff is added in small portions to prevent lumping. After heating about 45 minutes, the reaction mixture begins to foam and the heat source is removed. After cooling to 130° C., the entire contents are poured into water and stirred for 1 hour. The phosphonated product is a dark solid which is filtered off, washed neutral with hot water and dried. The product is insoluble in water, the P analysis being 5.16%, corresponding approximately to the introduction of 1 phosphono group into the initial dioxazine dyestuff.

Example 2

The product of Example 1 is vatted by boiling a mixture containing 37.5 g. of pyridine, 12.5 g. of water, 0.1 g. of said product and 0.5 g. of sodium hydrosulfite for ½ hour. The vatted mixture is then diluted with 250 g. of water. A 10 g. sample of nylon tricot (reaction product of hexamethylene diamine and adipic acid) is treated in this vat dyeing solution for ½ hour at about 90° C., and then rinsed with water and allowed to oxidize in air. A brilliant blue dyeing is obtained having excellent fastness to light.

This invention has been disclosed with respect to certain preferred embodiments, and there will become obvious to persons skilled in the art various modifications, equivalents or variations thereof which are intended to be included within the spirit and scope of this invention.

We claim:

1. A phosphonated dioxazine dyestuff having the formula

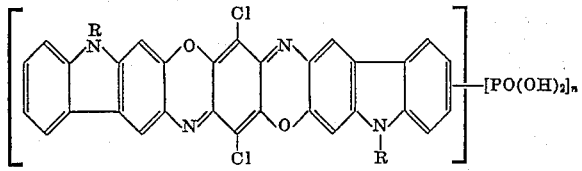

wherein R is selected from the group consisting of hydrogen, lower alkyl, lower haloalkyl, lower cyanoalkyl, lower hydroxyalkyl, cyclohexyl, benzyl, phenyl, diphenyl and naphthyl; and $n$ has a value of 1 to 2.

2. A dyestuff as defined in claim 1 wherein R is ethyl.

3. A process for producing a dyestuff as defined in claim 1 comprising dissolving a dioxazine dyestuff of the formula

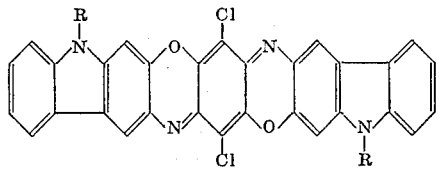

wherein R is selected from the group consisting of hydrogen, lower alkyl, lower haloalkyl, lower cyanoalkyl, lower hydroxyalkyl, cyclohexyl, benzyl, phenyl, diphenyl and naphthyl in phospholeum having a $P_2O_5$ content of about 76 to 86% by weight, at a temperature of about 100 to 200° C. and maintaining the resulting solution within said temperature range to complete the reaction.

4. A process as defined in claim 3 wherein R is ethyl.

5. A process as defined in claim 4 carried out at a temperature of about 160° C.

6. A vat dyeing solution adapted for dyeing nylon fibers containing the reduced form of a dyestuff as defined in claim 1 dissolved in a 25 to 85% by weight solution of pyridine in water.

7. A vat dyeing solution adapted for dyeing nylon fibers containing the reduced form of a dyestuff as defined in claim 2 dissolved in a 25 to 85% by weight solution of pyridine in water.

8. A vat dyeing solution adapted for dyeing nylon fibers containing the reduced form of a dyestuff as defined in claim 2 dissolved in a 75% by weight solution of pyridine in water.

9. A process for producing a solution as defined in claim 6 comprising treating a dyestuff as defined in claim 1 with sodium hydrosulfite in a 25 to 85% by weight solution of pyridine in water.

10. A process for producing a solution as defined in claim 7 comprising treating a dyestuff as defined in claim 2 with sodium hydrosulfite in a 25 to 85% by weight solution of pyridine in water.

11. A process for producing a solution as defined in claim 8 comprising treating a dyestuff as defined in claim 2 with sodium hydrosulfite in a 75% by weight solution of pyridine in water.

References Cited in the file of this patent

UNITED STATES PATENTS

| 2,026,092 | Kranzlein et al. | Dec. 31, 1935 |
| 2,066,915 | Thiess et al. | Jan. 5, 1937 |

FOREIGN PATENTS

| 878,788 | France | Oct. 26, 1942 |